(12) United States Patent
Yabuuchi et al.

(10) Patent No.: US 8,285,430 B2
(45) Date of Patent: Oct. 9, 2012

(54) CONTROLLING DEVICE FOR RAILWAY ELECTRIC CAR

(75) Inventors: Masataka Yabuuchi, Tokyo (JP); Hidetoshi Kitanaka, Tokyo (JP); Keiji Nakatsu, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 427 days.

(21) Appl. No.: 12/665,669

(22) PCT Filed: Jun. 27, 2007

(86) PCT No.: PCT/JP2007/062930
§ 371 (c)(1),
(2), (4) Date: Dec. 18, 2009

(87) PCT Pub. No.: WO2009/001452
PCT Pub. Date: Dec. 31, 2008

(65) Prior Publication Data
US 2010/0179713 A1    Jul. 15, 2010

(51) Int. Cl.
*B61C 15/08* (2006.01)
*B61C 9/46* (2006.01)

(52) U.S. Cl. ............... 701/19; 701/84; 701/90; 105/61; 105/76; 246/168.1

(58) Field of Classification Search ............... 701/19
See application file for complete search history.

(56) References Cited

U.S. PATENT DOCUMENTS

| | | | | |
|---|---|---|---|---|
| 2,591,840 A | * | 4/1952 | Lillquist | ............... 105/73 |
| 2,806,149 A | * | 9/1957 | Lillquist | ............... 290/17 |
| 4,095,147 A | * | 6/1978 | Mountz | ............... 318/52 |
| 4,896,090 A | | 1/1990 | Balch et al. | |
| 4,915,328 A | | 4/1990 | Nakamoto | |
| 5,436,538 A | * | 7/1995 | Garvey et al. | ............... 318/52 |
| 6,208,097 B1 | * | 3/2001 | Reddy et al. | ............... 318/52 |

(Continued)

FOREIGN PATENT DOCUMENTS

EP    1 547 841    6/2005

(Continued)

OTHER PUBLICATIONS

Office Action (Official Notice of Allowance) dated May 5, 2011, issued in the corresponding Russian Patent Application No. 2010102524/11(003488).

(Continued)

*Primary Examiner* — Shelley Chen
(74) *Attorney, Agent, or Firm* — Buchanan Ingersoll & Rooney PC

(57) ABSTRACT

Provided is a controlling device for a railway electric car, the controlling device being able to detect a slipping/sliding phenomenon during, in particular, high-speed travel and to exercise slipping/sliding control in an appropriate manner. A slip controlling unit 1 includes a first adhesion level index generating unit and a second adhesion level index generating unit. In a normal slipping state in which an acceleration changes instantaneously, torque control is exercised by using a first adhesion level index generated by the first adhesion level index generating unit based on an acceleration deviation and a speed deviation. In a slipping state during high-speed travel, because the acceleration deviation and the speed deviation are small, torque control is exercised by using a second adhesion level index generated by multiplying the first adhesion level index by a gain equal to or smaller than 1 generated by the second adhesion level index generating unit.

10 Claims, 6 Drawing Sheets

U.S. PATENT DOCUMENTS

| | | | |
|---|---|---|---|
| 6,634,303 B1 * | 10/2003 | Madsen et al. | 105/73 |
| 7,288,909 B2 | 10/2007 | Yokozutsumi et al. | |
| 7,679,298 B2 * | 3/2010 | Kumar | 318/66 |
| 7,930,076 B2 * | 4/2011 | Daum et al. | 701/19 |

FOREIGN PATENT DOCUMENTS

| | | |
|---|---|---|
| JP | 6-335106 A | 12/1994 |
| JP | 7-67202 B2 | 7/1995 |
| JP | 7-322406 A | 12/1995 |
| JP | 08-084405 | 3/1996 |
| JP | 2002-345108 A | 11/2002 |
| JP | 2003-134603 A | 5/2003 |
| JP | 2003-348706 A | 12/2003 |
| KR | 1019990023040 A | 3/1999 |
| KR | 1020010024204 A | 3/2001 |
| KR | 1020060052977 A | 5/2006 |
| RU | 2179515 | 2/2002 |
| RU | 2270766 | 2/2006 |
| WO | WO 2005/110802 A1 | 11/2005 |

OTHER PUBLICATIONS

Office Action dated May 15, 2011, issued in the corresponding Korean Patent Application No. 10-2009-7024110.

Supplementary European Search Report dated Sep. 27, 2010, issued in the corresponding European Application No. 07828150.8-2207.

International Search Report (PCT/ISA/210) dated Sep. 25, 2007 for PCT/JP2007/062930.

Written Opinion (PCT/ISA/237) dated Oct. 9, 2007 for PCT/JP2007/062930.

Korean Notice of Allowance (Decision of Patent Grant) dated May 25, 2012, issued in corresponding Korean Application No. 10-2009-7024110.

* cited by examiner

CONTROLLING DEVICE FOR RAILWAY ELECTRIC CAR

TECHNICAL FIELD

The present invention generally relates to a controlling device for railway electric cars and specifically relates to a controlling device for railway electric cars that has a slipping/sliding controlling function to inhibit the wheels from spinning free and sliding.

BACKGROUND ART

As a controlling device for railway electric cars, systems that drive and control an alternate-current motor by using an inverter have already been put into practical use. As is well known, accelerations and decelerations of railway cars are realized by powers that are transmitted between iron rails and iron wheels within the small contact areas therebetween. Thus, a controlling device for railway electric cars needs to control the torque of the electric motor in an appropriate manner so that the wheels do not spin free. In other words, if the torque is too high, the wheels spin free, and a friction coefficient (hereinafter, it may also be referred to as an "adhesion coefficient") between the wheels and the rails decreases, so that the efficiency of transmitting the powers also decreases. As a result, problems arise where the railway electric cars cannot be accelerated in a satisfactory manner and where the wheels and the rails wear down. Conversely, if the torque is too low, although the wheels do not spin free, the railway electric cars cannot be accelerated in a satisfactory manner, and it becomes difficult for the railway electric cars to run on schedule. Also, the same applies to when a regenerative brake is used.

Conventionally, controlling devices for railway electric cars have a slip controlling system for inhibiting the slipping phenomenon of the wheels as described above. Generally speaking, such a slip controlling system is configured so as to determine a slipping state of the wheels by using rates of change of the wheels' speeds and a speed deviation among a plurality of wheels and to adjust the torque of the electric motor. There may be, however, some substances such as rain, snow, sand, and grease between the rails and the wheels. In addition, the adhesion coefficient greatly changes constantly according to the state of the surfaces of the rails and the wheels, the temperature, and the traveling speed of the railway electric cars. Thus, physical phenomena of the rails and the wheels are complex, and it is not easy to formulate a control law. For this reason, a large number of methods that can be used by slip controlling systems have been proposed based on theoretical studies from various aspects and data from test runs using actual railway electric cars (see, for example, Patent Document 1).

Patent Document 1: Japanese Patent Application Laid-open No. H06-335106

DISCLOSURE OF INVENTION

Problem to be Solved by the Invention

The conventional techniques described above, however, have problems as follows: In the regular railway systems such as local trains in Japan, it is easy to recognize the slipping/sliding phenomenon based on the rates of change of the wheels' speeds and the speed deviation among a plurality of wheels, because the rates of change of the wheels' speeds are relatively high, and also, the speed deviation among the wheels is also relatively large when the wheels spin free or slide. However, while a railway electric car is running at a high speed (e.g., approximately 200 kilometers per hour or higher) in a high-speed railway system, the rates of change of the wheels' speeds are low, and the speed deviation among a plurality of wheels is also small when a slipping/sliding is occurring. Thus, a problem remains where it is difficult to recognize a slipping/sliding phenomenon based on the rates of change of the wheels' speeds and the speed deviation among the wheels and it is difficult to distinguish a situation where the railway electric car is in an accelerating state during normal travel, from a situation where a slipping/sliding is occurring.

In view of the problems described above, it is an object of the present invention to provide a controlling device for a railway electric car, the controlling device being able to detect the slipping/sliding phenomenon during, in particular, high-speed travel and to exercise slipping/sliding control in an appropriate manner.

Means for Solving Problem

In order to solve the aforementioned problems, a controlling device for a railway electric car according to one aspect of the present invention is constructed in such a manner as to include a plurality of electric motors and a slipping/sliding controlling unit that generates a torque command value so as to inhibit a slipping or sliding based on rotation speeds of the plurality of electric motors, wherein the slipping/sliding controlling unit includes: a reference rotation speed calculator that calculates a first reference rotation speed and a second reference rotation speed by using the rotation speeds of the plurality of electric motors; first adhesion level index generating units that are provided in correspondence with the electric motors respectively, and each of the first adhesion level index generating units receives, as an input, the first reference rotation speed and the rotation speed of a corresponding one of the electric motors and generates a first adhesion level index that is an index for an adhesion level between a wheel that is connected to the corresponding electric motor and a surface that is trodden by the wheel, based on an acceleration deviation that is a difference between an acceleration calculated by using the rotation speed of the corresponding electric motor and an acceleration calculated by using the first reference rotation speed and based on a speed deviation that is a difference between the rotation speed of the corresponding electric motor and the first reference rotation speed; a second adhesion level index generating unit that receives, as an input, the second reference rotation speed and generates a second adhesion level index value by multiplying the first adhesion level index value by a gain that has been generated based on an acceleration calculated by using the second reference rotation speed; and a torque command value generating unit that generates the torque command value based on the second adhesion level index value.

Effect of the Invention

According to an aspect of the present invention, even in the situation where a slipping or sliding is occurring during high-speed travel and where the acceleration deviation and the speed deviation are small so that it is not effective to exercise slipping or sliding control by adjusting the torque based on the first adhesion level index, it is possible to exercise slipping or sliding control in an appropriate manner by setting the gain generated by the second adhesion level index generating unit to a predetermined value smaller than 1. As a result, an advantageous effect is achieved where, without the need to additionally use new rotation speed information of non-drive shafts or the like, it is possible to recognize a slipping/sliding phenomenon only based on the rotation speed information of the drive shafts connected to the wheels, to detect a slipping/sliding state before the speed becomes greatly different from an actual value, and to exercise slipping/sliding control in an appropriate manner.

EXPLANATIONS OF LETTERS OR NUMERALS

Figure 1:
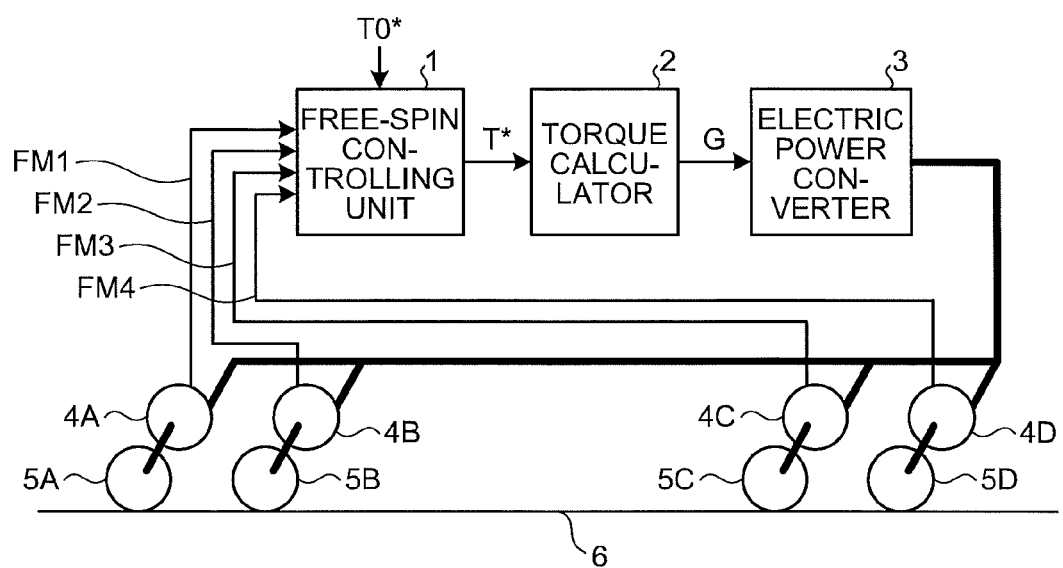
FIG. 1 is a diagram of a controlling device for a railway electric car according to an embodiment of the present invention.

1 Slip controlling unit
2 Torque calculator
3 Electric power converter
4A to 4D Electric motor
5A to 5D Wheel
Rail
7A to 7D First adhesion level index generating unit
8 Second adhesion level index generating unit
9 Maximum value calculator
10 Minimum value calculator
11, 13, 19 Differentiator
12 Reference rotation speed calculator
14, 16 Subtractor
15, 17, 20 Low-pass filter (LPF)
18 Judging device
21 Comparator
22, 23 Inverter
24 Off-delay unit
25 ADL processing unit
26 Multiplier
27 Multiplier (Torque command value generating unit)
28 First-order delay unit
29 Acceleration calculator
30 Acceleration deviation processing unit
31 Differential speed deviation processing unit
32 Acceleration responsiveness lowering unit
33 Slip detecting unit
34 Gain generating unit
35 Time constant setting unit

BEST MODE(S) FOR CARRYING OUT THE INVENTION

Exemplary embodiments of a controlling device for a railway electric car according to the present invention will be explained in detail, with reference to the accompanying drawings. The present invention is not limited to the exemplary embodiments. In addition, although slip control is explained below, the same applies to sliding control.

Exemplary Embodiments

Figure 2:
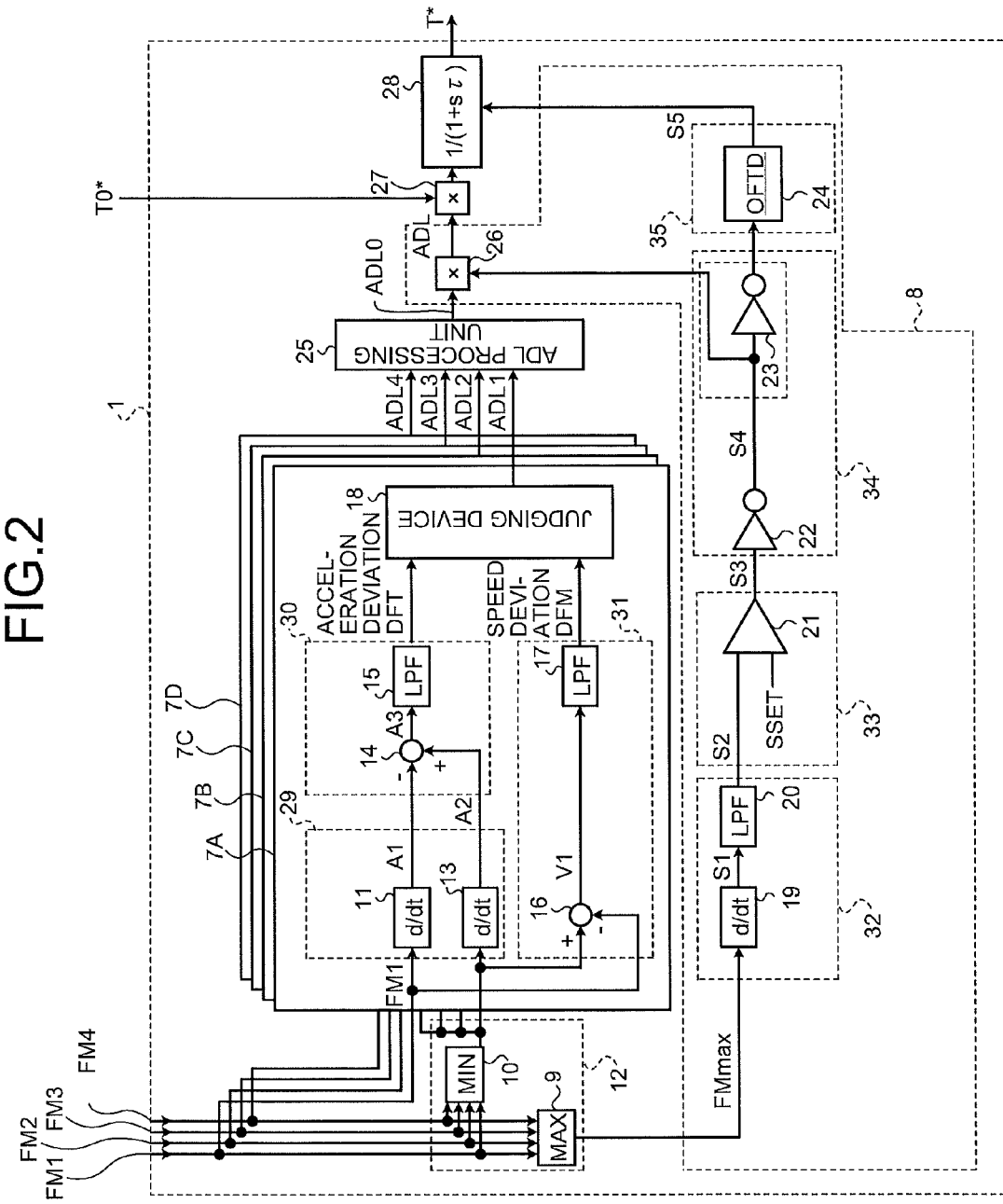
FIG. 2 is a diagram of a slip controlling unit according to the embodiment.

FIG. 1 a diagram of a controlling device for a railway electric car according to an embodiment of the present invention. FIG. 2 is a diagram of a slip controlling unit according to the embodiment.

First, a configuration of the controlling device for a railway electric car according to the present embodiment will be explained, with reference to FIG. 1. The reference character 1 denotes a controlling unit that performs a torque control so as to resolve a slipping or sliding state. In the following sections, to simplify the description, the controlling unit will be simply referred to as a "slip controlling unit". A torque command value T0* corresponding to a non-slipping state is input to the slip controlling unit 1. After a calculation has been performed on the torque command value T0* while a slipping state is taken into account, the slip controlling unit 1 outputs a torque command value T*. The reference character 2 denotes a torque calculator. The torque calculator 2 receives, as an input, the torque command value T* and outputs a gate control output G. The reference character 3 denotes an electric power converter. The electric power converter 3 is controlled based on the gate control output G, which is an output of the torque calculator 2. In the example shown in FIG. 1, a plurality of electric motors 4A to 4D are collectively driven.

Each of the reference characters 5A to 5D denotes a wheel. The reference character 6 denotes a rail. The electric motors 4A to 4D are connected to shafts of the wheels 5A to 5D, respectively, and cause the wheels 5A to 5D to rotate, respectively. Due to friction forces generated between the wheels 5A to 5D and the rail 6, the railway electric car obtains a propulsive force via the rotations of the wheels 5A to 5D. Further, the reference characters FM1 to FM4 denote speed signals detected by sensors (not shown) that are installed on the electric motors 4A to 4D, respectively. The speed signals FM1 to FM4 indicate rotation speeds of the shafts of the electric motors 4A to 4D, respectively.

Next, a configuration of the slip controlling unit 1 will be explained, with reference to FIG. 2. The reference characters 7A to 7D denote first adhesion level index generating units that respectively generate adhesion level indexes ADL1 to ADL4, which are indexes of adhesion levels between the wheels 5A to 5D and the rail 6, respectively. The reference character 8 denotes a second adhesion level index generating unit that is provided separately from the first adhesion level index generating units 7A to 7D. The reference character 9 denotes a maximum value calculator that outputs a maximum value FMmax among the rotation speeds FM1 to FM4. The reference character 10 denotes a minimum value calculator that outputs a minimum value FMmin among the rotation speeds FM1 to FM4. The maximum value calculator 9 and the minimum value calculator 10 are provided within a reference rotation speed calculator 12. The reference rotation speed calculator 12 outputs the FMmin to each of the first adhesion level index generating units 7A to 7D, and also, outputs the FMmax to the second adhesion level index generating unit 8. In the present embodiment, the reference rotation speed calculator 12 calculates the minimum value FMmin and the maximum value FMmax, based on the rotation speeds FM1 to FM4. However, the present invention is not limited to this example. Any other arrangement is also acceptable as long as two reference rotation speeds are obtained, based on the rotation speeds FM1 to FM4.

Two signals representing the FMmin and the rotation speed FM1 are input to the first adhesion level index generating unit 7A. Similarly, two signals representing the FMmin and the rotation speed FM2 are input to the first adhesion level index generating unit 7B. Also, two signals representing the FMmin and the rotation speed FM3 are input to the first adhesion level index generating unit 7C. Further, two signals representing the FMmin and the rotation speed FM4 are input to the first adhesion level index generating unit 7D. The FMmax is input to the second adhesion level index generating unit 8.

Next, the first adhesion level index generating unit 7A will be explained. Each of the first adhesion level index generating units 7B to 7D is similar to the first adhesion level index generating unit 7A. The reference character 11 denotes a differentiator. The differentiator 11 receives, as an input, the rotation speed FM1 and outputs an acceleration A1, which is a rate of change of the rotation speed FM1 with respect to time. The reference character 13 denotes another differentiator. The differentiator 13 receives, as an input, the FMmin and outputs an acceleration A2, which is a rate of change of the FMmin with respect to time. The differentiator 11 and the differentiator 13 structure an acceleration calculator 29 serving as a first acceleration calculator. The reference character 14 denotes a subtractor. By using the acceleration A1 and the acceleration A2, the subtractor 14 outputs A3 (=A2−A1). The reference character 15 denotes a low-pass filter. The low-pass filter 15 receives, as an input, A3 and outputs an acceleration deviation DFT. The calculation sampling period of the differentiator 11 is set shorter, whereas the calculation sampling period of the differentiator 13 is set longer. The subtractor 14 and the low-pass filter 15 structure an acceleration deviation processing unit 30.

The reference character 16 denotes another subtractor. The subtractor 16 outputs a difference between the rotation speed FM1 and the FMmin as a speed difference V1. The reference character 17 denotes another low-pass filter. The low-pass filter 17 receives, as an input, the speed difference V1 and outputs a speed deviation DFM. The subtractor 16 and the low-pass filter 17 structure a differential speed deviation processing unit 31.

In the configuration described above, the acceleration A1 is an acceleration of the rotation speed FM1 of a first shaft, which is the shaft of the electric motor 4A, and is an instantaneous acceleration. In contrast, the acceleration A2 is an acceleration of the FMmin, which is the lowest rotation speed among the rotation speeds of the wheels 5A to 5D, and is a reference acceleration that has almost no instantaneous change. As described above, because the calculation sampling period of the differentiator 13 is set longer, the acceleration A1 has almost no instantaneous change. Thus, it is possible to use the acceleration A2 as the reference acceleration. The acceleration deviation DFT can be obtained by applying a first-order delay process in the low-pass filter 15 to the difference A3 between the acceleration A2, which is used as the reference acceleration, and the acceleration A1, which is an instantaneous value. Further, the speed deviation DFM can be obtained by applying a first-order delay process in the low-pass filter 17 to the speed difference V1, which is a difference between the rotation speed FM1 of the first shaft and the FMmin.

The reference character 18 denotes a judging device. The judging device 18 receives, as an input, the acceleration deviation DFT and the speed deviation DFM and outputs the adhesion level index ADL1 of the first shaft in a one-to-one correspondence manner, based on a combination of the input values. In other words, the judging device 18 judges an adhesion level state based on the acceleration deviation DFT and the speed deviation DFM and outputs the adhesion level index ADL1 indicating the adhesion state by, for example, weighting the acceleration deviation DFT and the speed deviation DFM with a predetermined ratio.

Figure 3:
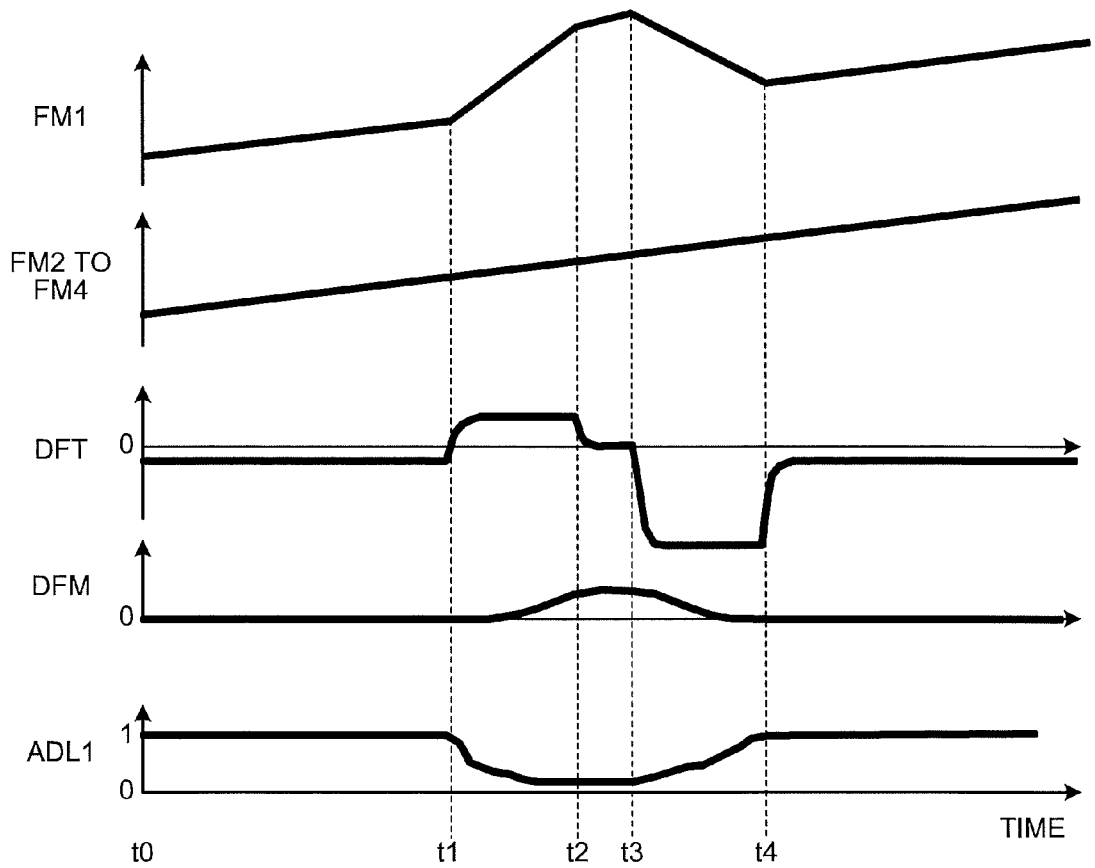
FIG. 3 is an operation chart of a speed deviation DFM, an acceleration deviation DFT, and an adhesion level index ADL1, in a situation where a wheel 5A connected to a first shaft spins free.

FIG. 3 is an operation chart of the speed deviation DFM, the acceleration deviation DFT, and the adhesion level index ADL1, in a situation where the wheel 5A connected to the first shaft spins free. While the horizontal axis expresses time, temporal changes in the rotation speeds FM1 to FM4, the speed deviation DFM, the acceleration deviation DFT, and the adhesion level index ADL1 are shown. Between a time t1 and a time t4, at least one of the deviations (i.e., one or both of the speed deviation DFM and the acceleration deviation DFT) increases. Accordingly, the adhesion level index ADL1 has a value smaller than 1. In particular, by looking at the adhesion level index ADL1 between a time t2 and a time t3, it is understood that the impact of the acceleration deviation DFT is more dominant than that of the speed deviation DFM. It is to be noted that when the adhesion level index is 1, it is judged that the wheel is not spinning free. It is determined that the lower the adhesion level index is below 1, the more the wheel is spinning free.

The same process is performed on each of the first adhesion level index generating units 7B to 7D. The adhesion level indexes ADL2 to ADL4 are thus obtained.

The reference character 25 denotes an ADL processing unit. Outputs of the first adhesion level index generating units 7A to 7D are input to the ADL processing unit 25. In other words, the ADL processing unit 25 receives, as an input, the adhesion level indexes ADL1 to ADL4 and, after performing, for example, a maximum value selecting process or an averaging process thereon, the ADL processing unit 25 outputs the result as an adhesion level index ADL0. In this situation, the maximum value selecting process is a process to select such an index value among the adhesion level indexes ADL1 to ADL4 that has the largest change from 1. The averaging process is a process to select the average value of the adhesion level indexes ADL1 to ADL4.

The reference characters 26 and 27 denote multipliers. The reference character 28 denotes a first-order delay unit that causes a first-order delay. A time constant used by the first-order delay unit 28 will be referred to as τ. The adhesion level index ADL0 that has been output from the ADL processing unit 25 is multiplied by a gain in the multiplier 26, as explained below, and is further multiplied in the multiplier 27 (torque command value generating unit) by a torque command T0* corresponding to a steady period based on an operation command. The result is then input to the first-order delay unit 28 where a first-order delay is applied thereto and is subsequently output from the slip controlling unit 1 as a torque command T*.

While the wheel is not spinning free, the adhesion level index ADL0 is 1. On the contrary, while the wheel is in a slipping state, the adhesion level index ADL0 has a value equal to or smaller than 1 based on the combination of the acceleration deviation DFT and the speed deviation DFM. Thus, T0*>T* is satisfied, so that the torque is lowered by "T0*−T*". A time constant used for lowering or recovering the torque is adjusted by using the time constant τ used by the first-order delay unit 28.

Figure 4:
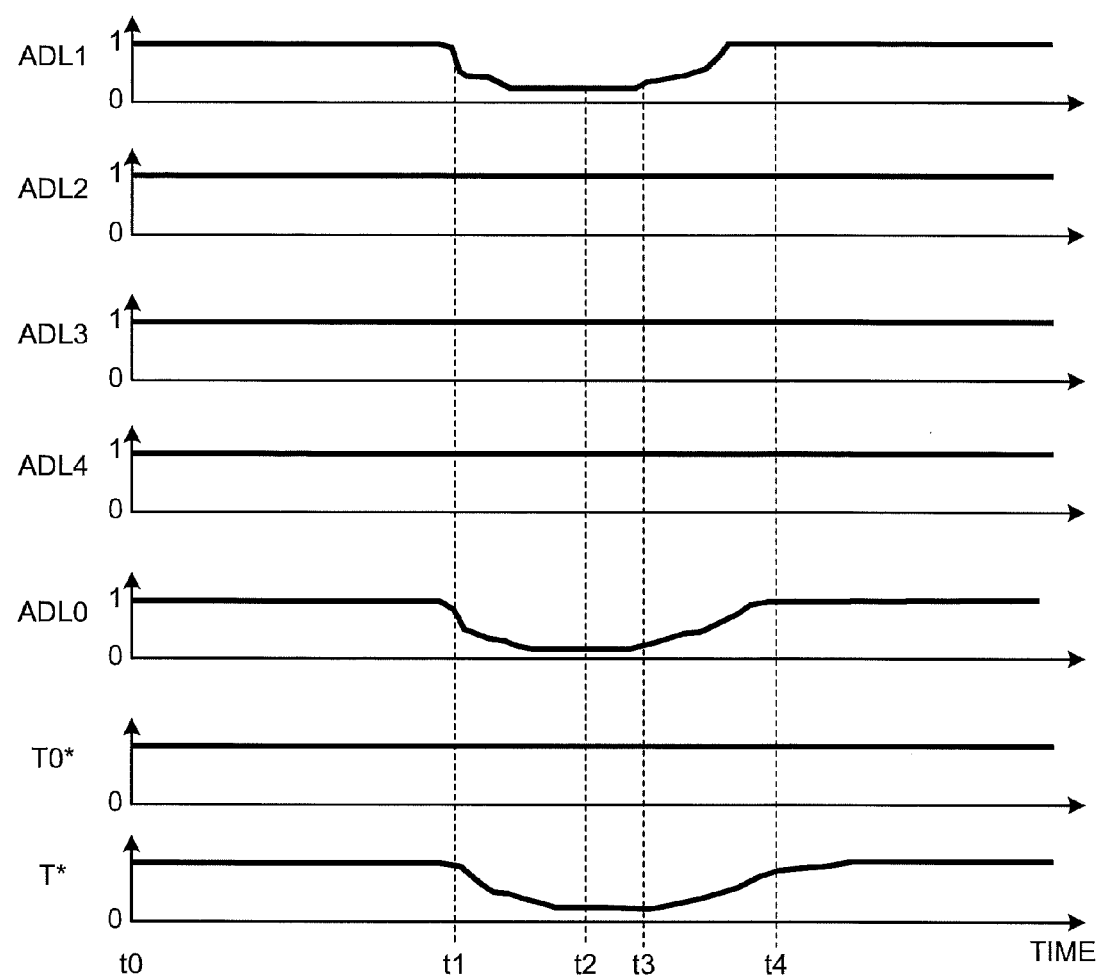
FIG. 4 is an operation chart of adhesion level indexes ADL1 to ADL4 of mutually different shafts, an adhesion level index ADL0 to which a maximum value selecting process has been applied, a torque command T0* corresponding to a steady period, and a torque command T* that has been adjusted by slip control.

FIG. 4 is an operation chart of adhesion level indexes ADL1 to ADL4 of the shafts, the adhesion level index ADL0 to which the maximum value selecting process has been applied, the torque command T0* corresponding to a steady period, and the torque command T* that has been adjusted by slip control. As shown in FIG. 4, the torque command T* is output in a finely-adjusted manner according to the changes in the adhesion level index ADL0.

In the operation described above, it is possible to establish a setting where the acceleration deviation DFT is more dominant in terms of responsiveness to the slip control, so as to cause the acceleration deviation to converge by more finely adjusting the responding speed or the resolution capability of the reference acceleration. Thus, it is possible to exercise adhesion control in a fast and finely-adjusted manner, by using the speed deviation DFM and the acceleration deviation DFT.

In the present embodiment, the ADL processing unit 25 outputs the single adhesion level index ADL0 based on the adhesion level indexes ADL1 to ADL4, so that the torque command T* is output according to the adhesion level index ADL0. In other words, the torques of the four electric motors 4A to 4D are collectively controlled by using the torque command T*. However, another arrangement is also acceptable in which four torque commands according to the adhesion level indexes ADL1 to ADL4 are output without using the ADL processing unit 25, so that the torques of the four electric motors 4A to 4D are individually controlled by using the four torque commands, respectively.

Next, the second adhesion level index generating unit 8 will be explained. The reference character 19 denotes yet another differentiator that receives, as an input, the FMmax having been output from the maximum value calculator 9 and outputs an acceleration S1. The reference character 20 denotes another low-pass filter. The low-pass filter 20 receives, as an input, the acceleration S1 and outputs an acceleration S2. The differentiator 19 and the low-pass filter 20 structure an acceleration responsiveness lowering unit 32 serving as a second acceleration calculator. In other words, by making the calculation interval of the differentiator 19 larger and/or making responses of the low-pass filter 20 slower, the acceleration S2, which is an output of the acceleration responsiveness lowering unit 32, is arranged so as not to immediately change in response to a minor or instantaneous change in the acceleration. In particular, the responding speed of the acceleration calculated by the acceleration responsiveness lowering unit 32 is arranged so as to be lower than the responding speed of the acceleration calculated by the acceleration calculator 29.

The reference character 21 denotes a comparator. The comparator 21 compares the acceleration S2 with an acceleration detection level SSET. When the comparator 21 has determined that the acceleration S2 is larger than the acceleration detection level SSET, an output S3 of the comparator 21 indicates an "H" level (i.e., a high level). On the contrary, when the comparator 21 has determined that the acceleration S2 is equal to or smaller than the acceleration detection level SSET, the output S3 of the comparator 21 indicates an "L" level (i.e., a low level). For example, "1" may be used as an output signal indicating the "H" level, whereas "0" may be used as an output signal indicating the "L" level. The acceleration detection level SSET is a predetermined value that is set for each railway electric car. It is also acceptable to configure the acceleration detection level SSET so as to be variable. As explained below, the comparator 21 has a function as a slip detecting unit 33.

The reference characters 22 and 23 denote inverters. Each of the inverters 22 and 23 inverts a received input and outputs the result of the inversion. The reference character 24 denotes an off-delay unit. The output S3 of the comparator 21 is input to the inverter 22, so that the inverter 22 outputs S4. The output S4, which is an output of the inverter 22, is input to the multiplier 26 and is also input to the inverter 23.

For example, in the case where the output S3 indicates the "H" level, the output S4 indicates the "L" level. Accordingly, the output S4 having a value indicating the "L" level is input to the multiplier 26, so that the adhesion level index ADL0 is multiplied by the value of the output S4 (hereinafter, the "gain"). The value indicating the "L" level used in the multiplication performed in the multiplier 26 is, for example, "0". However, the present invention is not limited to this example. It is acceptable to configure the value indicating the "L" level so as to be an arbitrary value equal to or smaller than "1". Thus, it is possible to configure the gain so as to be, for example, a value equal to or smaller than "1". In the case where the gain is set to be a value equal to or smaller than "1", the sum of a value corresponding to a situation where the output S4 indicates the "L" level and a value corresponding to a situation where the output S4 indicates the "H" level is configured so as to be "1". In the case where the output S4 is "0", the adhesion level index ADL, which is an output of the multiplier 26, is "0". Accordingly, the output of the multiplier 27 is also "0". In other words, in the case where the acceleration S2 is larger than the acceleration detection level SSET, slip control is exercised by outputting "0" as the torque command T*.

On the contrary, in the case where the acceleration S2 is equal to or smaller than the acceleration detection level SSET, the output S3 indicates the "L" level, whereas the output S4 indicates the "H" level. In this situation, the gain is, for example, "1". Accordingly, the adhesion level index ADL, which is an output of the multiplier 26, is "ADL0". Thus, the torque command T* is determined by the outputs of the first adhesion level index generating units 7A to 7D. As explained here, the inverters 22 and 23 structure a gain generating unit 34, by using the output of the slip detecting unit 33. According to the present embodiment, the value of the gain is configured so as to be changed depending on which one of the acceleration S2 and the acceleration detection level SSET is larger. However, another arrangement is also acceptable in which, for example, the value of the gain is configured so as to be changed depending on which one among the acceleration S2 and two acceleration detection levels is the largest and the second largest. For example, let us assume that the two acceleration detection levels are referred to as a first acceleration detection level and a second acceleration detection level that is smaller than the first acceleration detection level. In this situation, it is possible to configure the value of the gain so as to become larger in correspondence with the following three ranges in the stated order: (i) a range in which the acceleration S2 is equal to or larger than the first acceleration detection level; (ii) a range in which the acceleration S2 is equal to or larger than the second acceleration detection level, but is smaller than the first acceleration detection level; and (iii) a range in which the acceleration S2 is smaller than the second acceleration detection level.

The output S4 is also input to the inverter 23, and an output of the inverter 23 is input to the off-delay unit 24. An output S5 of the off-delay unit 24 is input to the first-order delay unit 28. In this situation, when the output S5 of the off-delay unit 24 once gets to the "H" level, for example, the "H" level state is maintained for a predetermined period of time, so that a signal indicating the "H" level keeps being output to the first-order delay unit 28. While the output S5 is at the "H" level, the time constant τ used by the first-order delay unit 28 is changed and set to a predetermined value. As explained here, the off-delay unit 24 functions as a time constant setting unit 35.

Even if the acceleration detection level SSET is configured so as to be a slightly larger than a normal acceleration, the output S3, which is the output of the comparator 21, remains at the "L" level in the normal state where the wheel is not spinning free or in a normal slipping state where the acceleration changes instantaneously. The reason for this can be explained as follows: Due to the function of the acceleration responsiveness lowering unit 32, the response of the changes in the acceleration is made slower. Thus, even if the acceleration of the FMmax exceeds the acceleration detection level SSET, the acceleration S2 remains equal to or smaller than the acceleration detection level SSET. Because the output S3 remains at the "L" level, the output S4 remains at the "H" level, while the output S5 remains at the "L" level. Thus, the adhesion level index ADL is equal to the adhesion level index ADL0, and also, the setting of the time constant τ used by the first-order delay unit 28 is not changed, either. As a result, there is no change at all in the controlling state of the second adhesion level index generating unit 8. As explained here, in the normal slipping state where the acceleration changes instantaneously, the first adhesion level index generating units 7A to 7D exercise optimal adhesion control in a fast and finely-adjusted manner.

On the contrary, when such a slipping phenomenon is occurring in which the change in the acceleration from the normal acceleration is small, and the increase in the speed is slow, the first adhesion level index generating units 7A to 7D do not exercise so much control as to inhibit the slipping phenomenon because the speed deviation DFM and the acceleration deviation DFT are small. In addition, in the case where such a slipping phenomenon continues, the acceleration S2 becomes equal to or larger than the acceleration detection level SSET, whereas the output S4 gets to the "L" level, i.e., for example, "0", in the second adhesion level index generating unit 8, whereas the adhesion level index ADL becomes "0" regardless of the calculation results of the first adhesion level index generating units 7A to 7D. Also, when the acceleration S2 becomes equal to or larger than the acceleration detection level SSET, due to a response delay caused by the acceleration responsiveness lowering unit 32, the acceleration S2 does not instantaneously become equal to or lower than the acceleration detection level SSET, and this state is maintained for a while. Being triggered by the output S5 getting to the "H" level, the first-order delay unit 28 changes the time constant τ. Further, for a predetermined period of time that is determined by the off-delay unit 24, the torque command T* is lowered by using the time constant that has been changed while "0" is used as a target value. After that, when the acceleration S2 becomes equal to or smaller than the acceleration detection level SSET, the torque command T* returns to a torque command corresponding to a steady period that is based on the adhesion level index ADL0.

Figure 5:
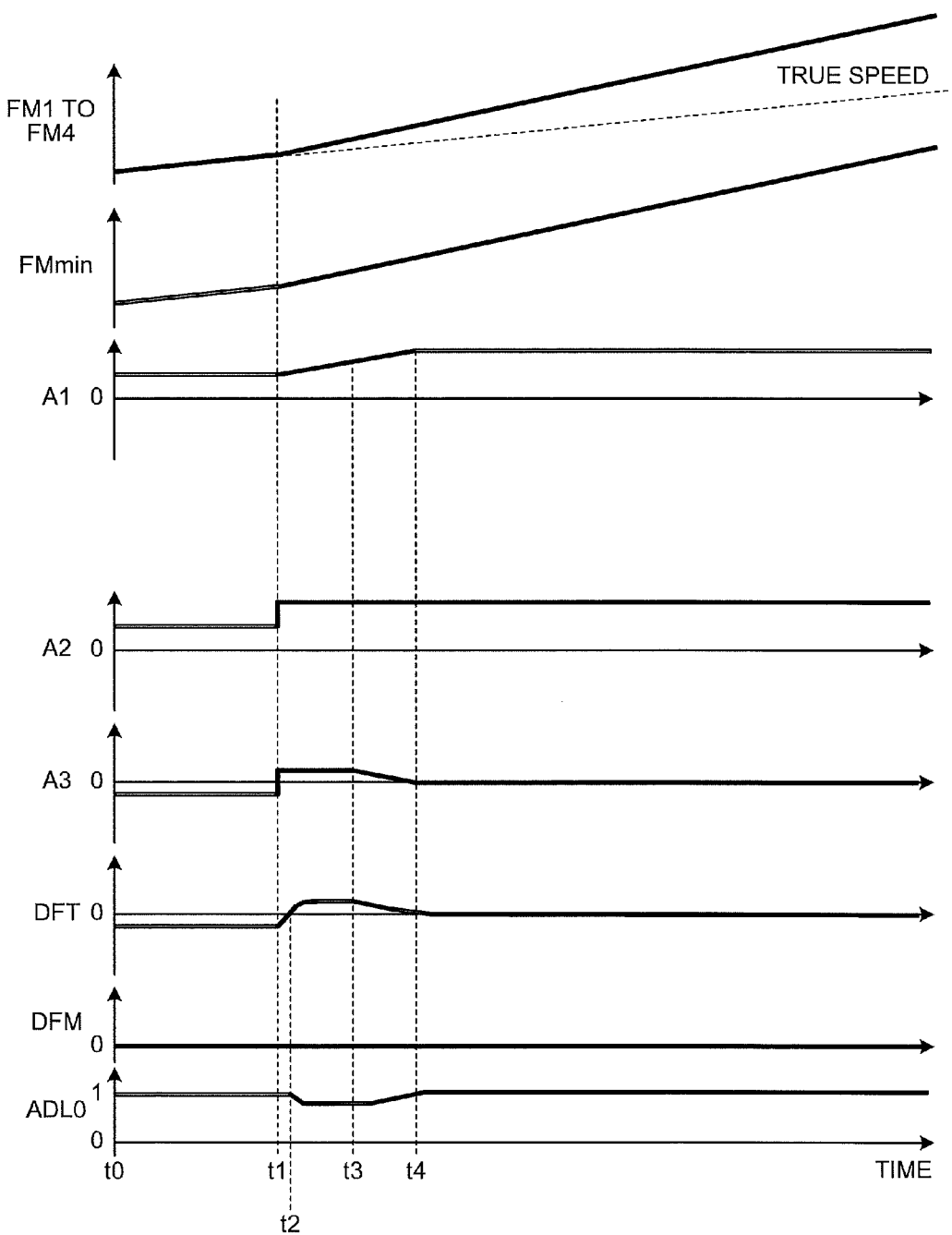
FIG. 5 is an operation chart of a first adhesion level index generating unit 7A in a situation where a minor slipping keeps occurring.

FIG. 5 is an operation chart of the first adhesion level index generating unit 7A~7D in a situation where a minor slipping keeps occurring. While the horizontal axis expresses time, transitions of levels of FM1 to FM4, FMmin, A1, A2, A3, DFT, DFM, ADL0 corresponding to a situation where the second adhesion level index generating unit 8 does not function are shown. The dotted line corresponding to FM1 to FM4 indicates the true speed. As for the level of FM1 to FM4, the deviation from the true speed increases due to the continuous minor slipping. It is indicated that a slipping is occurring. Also, it can be observed from this operation that the acceleration deviation DFT is small, while the change in the adhesion level index ADL0 from "1" is also small. Thus, it is understood that not so much control as to inhibit the slipping is exercised.

Figure 6:
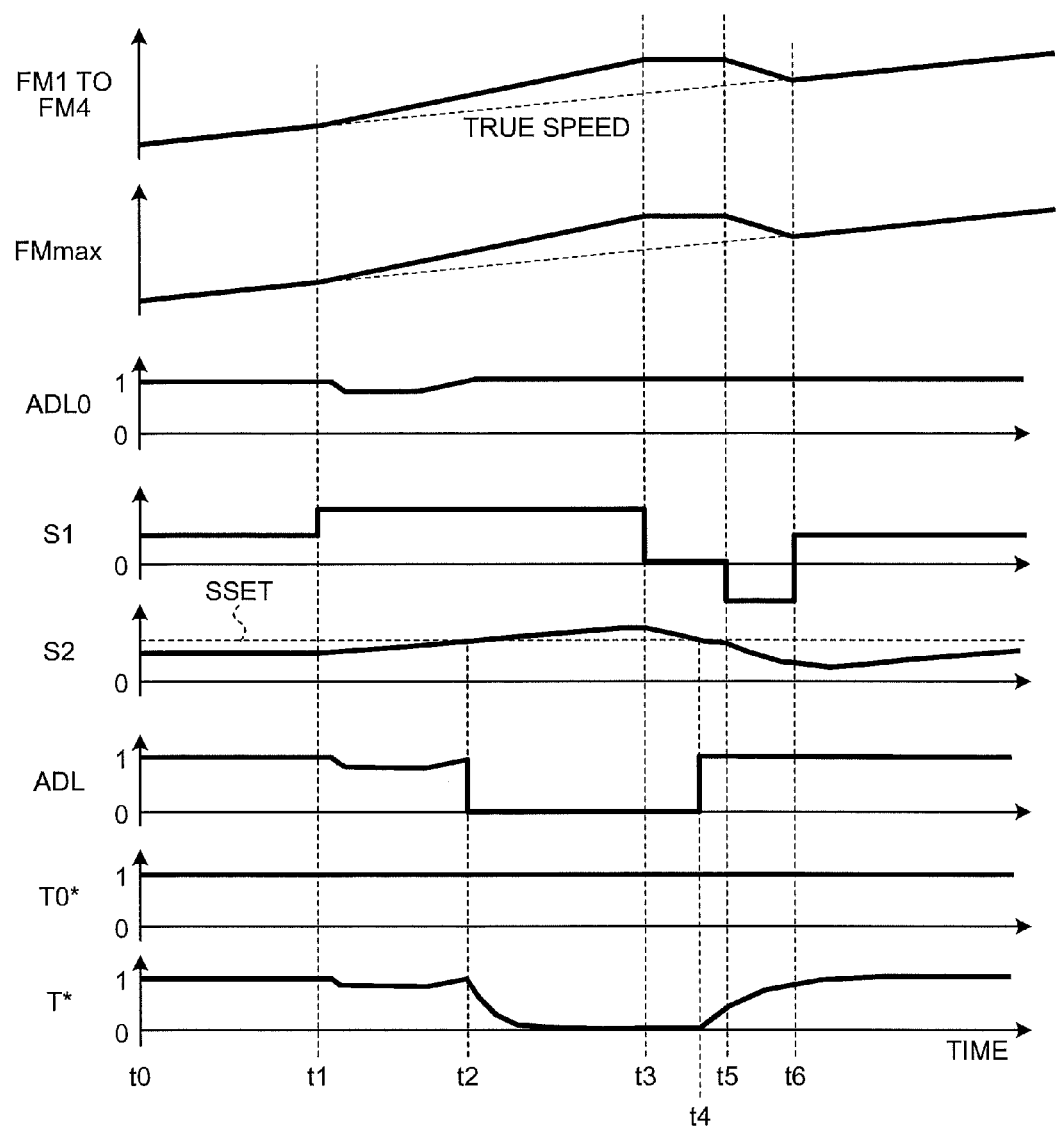
FIG. 6 is an operation chart of levels of FM1 to FM4, FMmax, ADL0, S1, S2, ADL, T0* and T* in a situation where a second adhesion level index generating unit is functioning.

FIG. 6 is an operation chart of levels of FM1 to FM4, FMmax, ADL0, S1, S2, ADL, T0* and T* in a situation where the second adhesion level index generating unit 8 is functioning. The chart indicates that, as for the level of FM1 to FM4, although the deviation from the true speed gradually increases over the course of time due to the continuous minor slipping, the deviation decreases again and that the slipping is inhibited by the control exercised by the second adhesion level index generating unit 8. Because a first-order delay is applied to the acceleration S1 by the low-pass filter 20, the acceleration S2 exceeds the acceleration detection level SSET between the time t2 and a time t5, so that the value of ADL becomes "0". As for the torque command T*, the value thereof is lowered from approximately "1" to "0" in the time period from the time t2 to the time t3. The rate of change of the torque command T* is determined by the setting of the time constant τ established by the first-order delay unit 28.

As explained above, according to the present embodiment, even in the situation where the acceleration deviation DFT and the speed deviation DFM are both small, and it is difficult to inhibit slippings with the control exercised by the first adhesion level index generating units 7A to 7D, it is possible to inhibit the slippings by using the second adhesion level index generating unit 8. As a result, without the need to additionally use new shaft speed information of non-drive shafts or the like, it is possible to recognize a slipping phenomenon only based on the speed information of the drive shafts, to detect a slipping state before the speed becomes greatly different from the actual value, and to exercise slip control in an appropriate manner. In particular, according to the present embodiment, it is possible to detect and inhibit slippings during, for example, high-speed travel.

The configurations described in the exemplary embodiments above are examples of the contents of the present invention. It is possible to combine the configurations with other publicly-known techniques or the like. Further, needless to say, it is possible to apply modifications to the configurations described above without departing from the gist of the present invention.

Further, the fields to which the slip control according to the present invention may be applied are not limited to controlling devices for railway electric cars. For example, it is possible to apply the slip control according to the present invention to other related fields such as electric automobiles.

INDUSTRIAL APPLICABILITY

As explained above, the controlling device for a railway electric car according to the present invention is useful in inhibiting slippings/sliding occurring during high-speed travel in high-speed railway systems and the like.

The invention claimed is:

1. A controlling device for a railway electric car, the controlling device including a plurality of electric motors and a slipping/sliding controlling unit that generates a torque command value so as to inhibit a slipping or sliding based on rotation speeds of the plurality of electric motors, wherein
the slipping/sliding controlling unit includes:
a reference rotation speed calculator that calculates a first reference rotation speed and a second reference rotation speed by using the rotation speeds of the plurality of electric motors;
first adhesion level index generating units that are provided in correspondence with the electric motors respectively, and each of the first adhesion level index generating units receives, as an input, the first reference rotation speed and the rotation speed of a corresponding one of the electric motors and generates a first adhesion level index that is an index for an adhesion level between a wheel that is connected to the corresponding electric motor and a surface that is trodden by the wheel, based on an acceleration deviation that is a difference between an acceleration calculated by using the rotation speed of the corresponding electric motor and an acceleration calculated by using the first reference rotation speed and based on a speed deviation that is a difference between the rotation speed of the corresponding electric motor and the first reference rotation speed;

a second adhesion level index generating unit that receives, as an input, the second reference rotation speed and generates a second adhesion level index value by multiplying the first adhesion level index value by a gain that has been generated based on an acceleration calculated by using the second reference rotation speed; and a torque command value generating unit that generates the torque command value based on the second adhesion level index value.

2. The controlling device for a railway electric car according to claim 1, wherein the slipping/sliding controlling unit further includes an adhesion level index processing unit that calculates a single adhesion level index by using the plurality of first adhesion level indexes having been generated by the plurality of adhesion level index generating units, respectively, and that outputs the single adhesion level index to the second adhesion level index generating unit, as the first adhesion level index, and torques of the plurality of electric motors are collectively controlled, based on the second adhesion level index value that has been generated by the second adhesion level index generating unit by multiplying the single adhesion level index by the gain.

3. The controlling device for a railway electric car according to claim 1, wherein each of the first adhesion level index generating units includes a first acceleration calculator that calculates the acceleration by using the rotation speed of the corresponding electric motor, and also, calculates the acceleration by using the first reference rotation speed, the second adhesion level index generating unit includes a second acceleration calculator that calculates the acceleration by using the second reference rotation speed, and a responding speed of the acceleration calculated by the second acceleration calculator is configured so as to be lower than a responding speed of the acceleration calculated by the first acceleration calculator.

4. The controlling device for a railway electric car according to claim 2, wherein each of the first adhesion level index generating units includes a first acceleration calculator that calculates the acceleration by using the rotation speed of the corresponding electric motor, and also, calculates the acceleration by using the first reference rotation speed, the second adhesion level index generating unit includes a second acceleration calculator that calculates the acceleration by using the second reference rotation speed, and a responding speed of the acceleration calculated by the second acceleration calculator is configured so as to be lower than a responding speed of the acceleration calculated by the first acceleration calculator.

5. The controlling device for a railway electric car according to claim 1, wherein the second adhesion level index generating unit changes a value of the gain depending on whether the acceleration calculated by using the second reference rotation number is larger than a predetermined value and, in a case where the acceleration is larger than the predetermined value, the gain is set to a smaller value.

6. The controlling device for a railway electric car according to claim 2, wherein the second adhesion level index generating unit changes a value of the gain depending on whether the acceleration calculated by using the second reference rotation number is larger than a predetermined value and, in a case where the acceleration is larger than the predetermined value, the gain is set to a smaller value.

7. The controlling device for a railway electric car according to claim 1, wherein in the second adhesion level index generating unit, a value of the gain is changed while using a first predetermined value and a second predetermined value that is smaller than the first predetermined value as gain value changing points with respect to the acceleration calculated by using the second reference rotation number, so that the value of the gain becomes larger in correspondence with three ranges as follows, in a stated order: (i) a range in which the acceleration calculated by using the second reference rotation speed is equal to or larger than the first predetermined value; (ii) a range in which the acceleration calculated by using the second reference rotation speed is equal to or larger than the second predetermined value, but is smaller than the first predetermined value; (iii) a range in which the acceleration calculated by using the second reference rotation speed is smaller than the second predetermined value.

8. The controlling device for a railway electric car according to claim 2, wherein in the second adhesion level index generating unit, a value of the gain is changed while using a first predetermined value and a second predetermined value that is smaller than the first predetermined value as gain value changing points with respect to the acceleration calculated by using the second reference rotation number, so that the value of the gain becomes larger in correspondence with three ranges as follows, in a stated order: (i) a range in which the acceleration calculated by using the second reference rotation speed is equal to or larger than the first predetermined value; (ii) a range in which the acceleration calculated by using the second reference rotation speed is equal to or larger than the second predetermined value, but is smaller than the first predetermined value; (iii) a range in which the acceleration calculated by using the second reference rotation speed is smaller than the second predetermined value.

9. The controlling device for a railway electric car according to claim 1, wherein the torque command value generating unit includes a first-order delay unit that outputs the torque command value having been generated based on the second adhesion level index value, after applying a first-order delay thereto, and the second adhesion level index generating unit includes an off-delay unit that sets a time constant used by the first-order delay unit according to a value of the gain.

10. The controlling device for a railway electric car according to claim 2, wherein the torque command value generating unit includes a first-order delay unit that outputs the torque command value having been generated based on the second adhesion level index value, after applying a first-order delay thereto, and the second adhesion level index generating unit includes an off-delay unit that sets a time constant used by the first-order delay unit according to a value of the gain.

* * * * *